June 20, 1939.  H. F. PATTERSON  2,162,788
POWER TRANSMISSION
Filed Nov. 27, 1936  4 Sheets-Sheet 2

INVENTOR
*Herbert F. Patterson.*
BY
*Harness, Lind, Patie & Harris —*
ATTORNEYS.

June 20, 1939. H. F. PATTERSON 2,162,788
POWER TRANSMISSION
Filed Nov. 27, 1936  4 Sheets-Sheet 4

INVENTOR.
Herbert F. Patterson.
BY
ATTORNEYS.

Patented June 20, 1939

2,162,788

UNITED STATES PATENT OFFICE 2,162,788

POWER TRANSMISSION

Herbert F. Patterson, Detroit, Mich., assignor to Chrysler Corporation, Highland Park, Mich., a corporation of Delaware Application November 27, 1936, Serial No. 112,860

25 Claims. (Cl. 74—262)

This invention relates to power transmission mechanism and refers more particularly to improvements in power transmission systems especially adapted for use in connection with motor vehicles, although not necessarily limited thereto.

My invention, in certain more limited aspects, provides improvements in the drive and control for power transmission systems having epicyclic or planetary gear trains adapted to provide the desired speed ratios between the vehicle engine and driving ground wheels.

One object of my invention resides in the provision of an improved selector and actuating mechanism for obtaining the several speed ratios provided by the speed changing mechanism, the latter being preferably of the planetary gear type although not necessarily limited thereto in the broader aspects of my invention.

A further object of my invention resides in the provision of improved controls and actuating mechanism for selecting and manipulating the various gear trains of a transmission, particularly a planetary type of transmission, whereby means is provided responsive in an improved manner to manual control for automatically and quickly bringing about a complete cycle of gear change.

In carrying out the above objects of my invention, I preferably provide a fluid pressure operating system for applying the necessary force to the braking devices of the planetary trains in order to control the rotation of the desired customary control drums. I have provided a selector operating mechanism under manual control by the vehicle driver for causing the various fluid actuators at the gear trains to quickly and efficiently apply a braking force to the proper drum. This power operating system, when of the fluid pressure type, is operated by oil pressure, air pressure either above or below atmospheric pressure, or other equivalent systems. I prefer, according to the teachings of this phase of my invention, to provide a power operating system employing oil pressure.

An additional object of my invention is to provide an improved transmission system adapted for manual control with a minimum of effort and a maximum of safety to the operating parts, my system of controls being arranged for manipulation with a minimum of effort and attention on the part of the vehicle driver, thereby increasing the safety of vehicle driving and the comfort of the driver.

A further object of my invention is to provide an improved arrangement of motor vehicle controls providing for improved ease of driving the vehicle, particularly for city driving where frequent starting and stopping is required.

A planetary type of transmission presents a number of advantages over the more conventional sliding gear type of transmissions, and my invention is therefore primarily directed toward planetary types of transmissions and power transmission systems employing planetary gear speed ratio devices, although, as aforesaid, the fundamental principles of my invention may, if desired, be employed in connection with transmissions of other types including the aforesaid sliding gear types of transmissions. By way of example, in connection with the aforesaid advantages of the planetary transmissions over more conventional types, it may be noted that the planetary transmission, especially when used in conjunction with a fluid type of clutch between the engine and transmission, permits gear changes without the necessity of releasing the heretofore conventional main clutch between the engine and transmission so as to obtain relatively quick gear changes and faster acceleration of the motor vehicle. This is made possible by reason of the fact that the braking devices associated with the planetary gear trains may quickly operate, the fluid clutch smoothing the shock of the gear change by reason of its inherent slipping qualities.

A still further object of my invention is to provide improved transmission controlling means, preferably for use with planetary gear transmissions, wherein a single manually operated selector element is shifted manually with multi-directional movements selectively to a plurality of stations of transmission control, a power operating selector mechanism automatically responding to the manual shifting.

I preferably provide a plurality of valving means, one for each transmission setting, these valving means controlling communication between a source of fluid pressure supply and the respective speed ratio gearing actuators, which for planetary transmissions, usually comprise brakes or clutches for the rotary elements to be engaged.

One further feature of my invention resides in the provision of an arrangement for shifting the manual selector element for transverse and longitudinal movements preferably in a substantially H-shape path, thereby adapting the system of control to that generally employed in more conventional gear shift lever operations for sliding gear types of transmissions.

Another object of my invention is to provide an improved remote control for a transmission, preferably of the planetary gear type, wherein the valving means for controlling operation of the speed devices is located at the transmission while the manual selector element is located remotely from the transmission and in position for convenient manipulation by the vehicle driver. Such arrangement confines the fluid pressure circuit to the transmission for simplicity and advantageous disposal of any leakage. The hand selector is capable of H-type movement, according to several embodiments of my invention, and the speed devices are each selectively operated in direct response to manual selection without manipulating the valving means for any speed ratio except the selected speed. Thus, for example, my remote control mechanism is such that the operator may shift from neutral to high without tendency to momentarily operate any other intervening speed ratio of the transmission, such as low or second. The transmission is therefore truly selective in its operation in direct response to selection at a single point remote from the transmission.

Other embodiments of my invention provide for a plurality of valving means controlled by a single selector element, each valving means controlling a plurality of planetary gear drives or settings of transmission controls in general.

Instead of providing for an H-type shifting of the selector element, other types of shifting may be employed if desired, the selector element having a push and pull as well as rotary movements, by way of example.

An additional object of my invention is to provide an improved planetary transmission control wherein the selector element is manipulated, preferably in an H-shaped path, the speeds corresponding to such shifting selectively and without operation of transmission drives other than the desired selected speeds.

Further objects and advantages of my invention will be apparent from the following detailed description of several embodiments of my invention, reference being had to the accompanying drawings in which.

Figure 1:
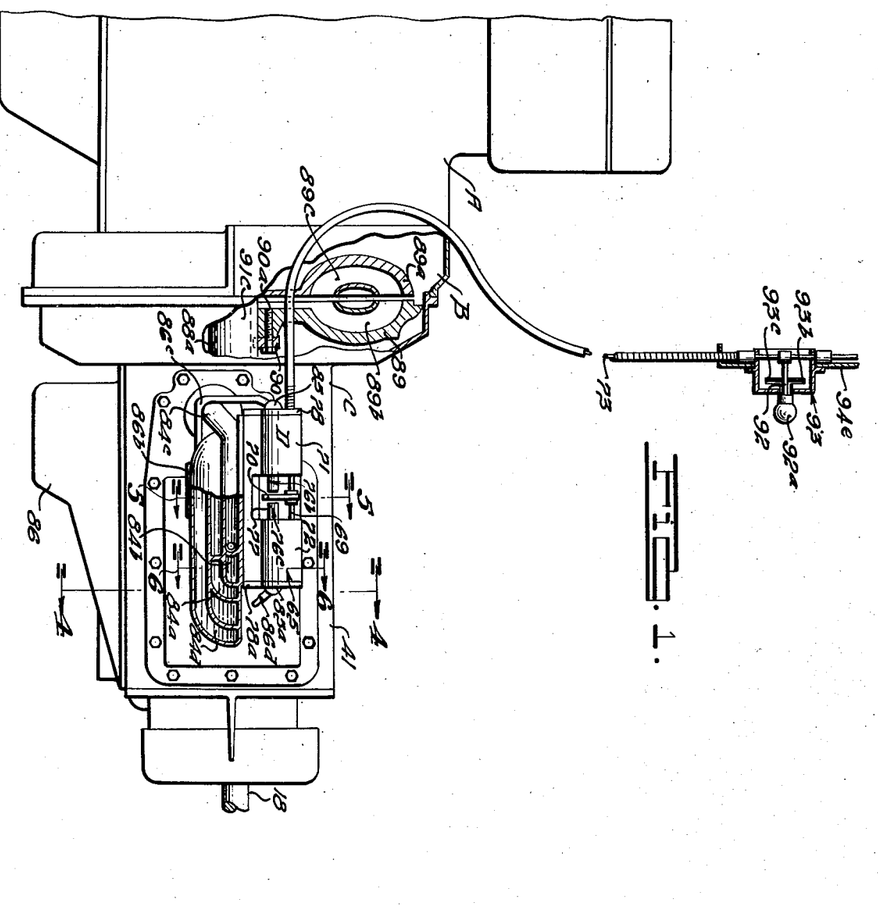
Fig. 1 is a side elevational view of my power transmission and associated controls.

Referring to the drawings, I have illustrated my invention in connection with a motor vehicle drive, this drive including a prime mover or engine A, a portion of which is shown in Fig. 1, a clutch B preferably of the fluid coupling type driven from the engine, and a change speed transmission or gear box C.

I have illustrated the change speed transmission C as the epicyclic or planetary type, this general form of transmission being well-known in the art and as usual, includes a plurality of controlling devices 14, 15 and 16, these devices being respectively adapted to actuate the transmission in its first speed ratio or low gear, second speed ratio, and reverse drive. A further controlling device 17 is illustrated as a cone type clutch, this clutch being adapted to control the transmission for effecting a direct drive through the transmission. The transmission has a power take-off shaft 18 which, where the transmission forms a part of a motor vehicle driving mechanism, may drive the usual well-known propeller shaft extending to the driving rear wheels (not shown) of the motor vehicle. As illustrative of my transmission control system I have shown my invention in conjunction with a planetary transmission disclosed in my Patent No. 2,105,755, issued January 18, 1938.

Figure 3:
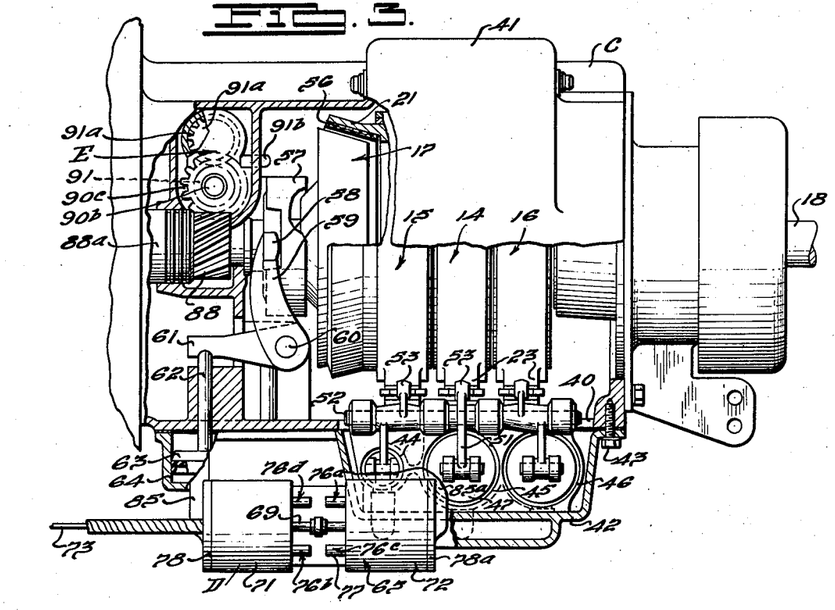
Fig. 3 is a top plan view of my transmission, parts of the casing being broken away to illustrate the operating mechanism.
Figure 4:
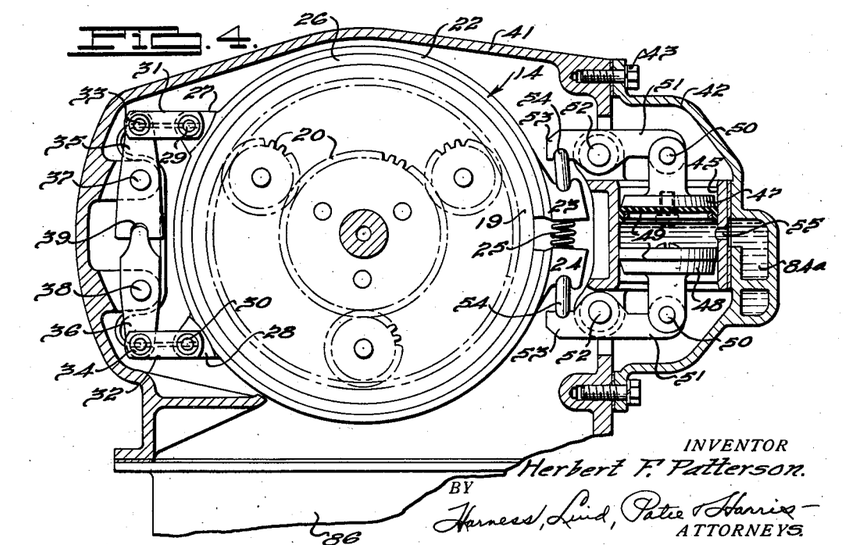
Fig. 4 is a transverse sectional elevational view through the transmission of Fig. 1, the section being taken along the line 4—4 of Fig. 1 and illustrating the controlling mechanism for one of the transmission gear trains.

The controlling devices 14, 15 and 16 are adapted to act on transmission elements associated therewith and usually embodied in the form of a rotary drum, one of which is illustrated at 19 in Fig. 4 in association with the transmission controlling device 14 for the first speed. It will be understood that the various transmission controlling devices 14, 15 and 16 may be adapted in the well-known manner for causing actuation of the respective epicyclic or planetary gear trains associated therewith, one of these gear trains being somewhat diagrammatically illustrated at 20 in Fig. 4. The form and arrangement of these planetary gear trains are well-known in the art and the details thereof are omitted from my disclosure. The clutch 17 is adapted to engage a drum portion 21 illustrated in Fig. 3 for effecting the direct drive in a manner well understood in the art.

The controlling devices 14, 15 and 16 are, for the most part, similar in construction and operation and the following description of the details of device 14 illustrated in Fig. 4 is typical of the other devices 15 and 16. In Fig. 4 the drum 19 is normally rotated by the planetary gearing 20 associated therewith when the transmission is not in its first gear ratio, and when rotation of drum 19 is prevented by the clutching or braking mechanism associated therewith, then the drive through the transmission takes place for the first gear ratio according to well-known practice for planetary gearings of the general type illustrated.

To brake the drum I have provided a band 22 extending around the drum to provide ends 23 and 24 normally separated by a spring 25, the band 22 being provided with a brake lining 26 adapted to contact with drum 19 when the ends 23 and 24 of the brake band are forced toward each other to contract the band.

In order to anchor the band 22 and guide the same during its contracting movement to efficiently distribute the braking forces applied to drum 19 without substantial tendency toward axial displacement of the drum, I have provided a pair of circumferentially spaced anchors 27 and 28 extending outwardly from band 22, these anchors being respectively pivoted by pins 29 and 30 to links 31 and 32. These links are respectively pivoted at 33 and 34 to levers 35 and 36, the latter having fixed pivots 37 and 38 and having their inner ends interengaged at 39. This arrangement of levers and links tends to equalize the braking effort applied by band 22 to drum 19 as aforesaid.

An opening 40 is provided at one side of the casing 41 of transmission C to accommodate the actuating mechanism for the devices 14, 15 and 16. This actuating mechanism is carried by a housing 42 secured by fasteners 43 to the casing 41, the housing 42 being provided with a plurality of cylinders 44, 45 and 46 respectively associated with the transmission controlling devices 15, 14 and 16. Each cylinder, such as the cylinder 45 illustrated in Fig. 4, receives a pair of opposed pistons 47 and 48, these pistons being sealed against escape of fluid by a resilient cup 49 associated therewith. Each of the pistons 47 and 48 is pivotally connected at 50 to a lever 51, the latter being pivoted to a rod 52. The inner and relatively short lever portions 53 are adapted to actuate the aforesaid ends 23 and 24 of band 22 through intermediate links 54, the arrangement being such that when fluid is introduced under pressure through a fluid inlet 55 of cylinder 45 the pistons 47 and 48 are forced apart to contract the band 22 by reason of the connecting levers 51 and links 54. In Fig. 4 the band 22 is illustrated in its actuated and contracted position.

The direct speed controlling clutch 17 is illustrated as a cone type clutch adapted to be actuated or shifted rearwardly, as viewed in Fig. 3, for braking or clutching engagement with a friction band 56 carried by drum 21, the clutch 17 being actuated by a shift collar 57 engaged by a yoke 58 of a lever 59 pivoted at 60. This lever has an actuating lever arm 61 extending forwardly in engagement with a piston rod 62 connected to piston 63 operating in a cylinder 64, the arrangement being such that when fluid under pressure is introduced to cylinder 64 the piston 63 will actuate lever 59 to engage clutch 17 with drum 21 and thereby establish the direct drive through transmission C.

I shall next describe my fluid pressure distributing valve structure and control therefor for selectively controlling the introduction of fluid under pressure to the cylinders 44, 45, 46 and 64 whereby the transmission C may be selectively placed in condition to effect the several driving speed ratios provided by the controlling devices 15, 14, 16 and clutch 17, respectively.

The pressure distributor mechanism is represented by the reference character D comprising a casing or housing member 65 secured by fasteners 66 to the upper face of the casting 67, a suitable gasket 68 being interposed in order to maintain a fluid seal between these parts.

The upper portion of the casing 65 is provided with a rotatable reciprocative rod 69 extending longitudinally therethrough and having a downwardly extending selector operating finger member 70 fixed thereon between forward and rearward extensions 71 and 72, respectively, of casing 65. The member 70 is a common selector operator for the various valves. The rod 69 may, if desired, extend forwardly in extension 71 for connection with a Bowden wire 73 which extends forwardly for manual manipulation by the selector operating mechanism which will be hereinafter more particularly described.

Each of extensions 71 and 72 is provided with a pair of coaxial bores 74, these two pairs having their axes disposed parallel to each other and having a forwardly and rearwardly open end respectively. The bores 74 lie in the same plane and are parallel with rod 69, the pair of bores 74 in extension 71 being in alignment with the pair in extension 72. A sleeve 75 mounted in each bore 74 is adapted to receive therein one of the reciprocative one-way valves 76$^a$, 76$^b$, 76$^c$, and 76$^d$ which has a stem portion 77 projecting through a closely fitting opening in one of the aforesaid surrounding extensions 71 and 72 so that each pair of said valves are normally in lateral alignment at a definite distance from the plane in which the finger member 70 is adapted to move transversely.

Inasmuch as the construction of the distributor mechanism for each of the valves 76$^a$, 76$^b$, 76$^c$, 76$^d$ is substantially similar, I shall describe as the representative one the construction of valve 76$^b$ in extension 72 and its cooperating mechanism. An end cap 78 is adapted to retain a coil-spring 79 inside sleeve 75 so that a valve portion 80 of valve 76$^b$ will be normally positioned against the extension 71. A second valve portion 81 on valve 76$^b$ is adapted to be positioned between an inlet port 82 and an outlet port 83 so that forward movement of valve 76$^b$ against spring 79 will bring the ports 82 and 83 between the valve portions 80 and 81. Fluid under pressure from a suitable pump is continuously supplied through the port 82 but does not pass the valve 76$^b$ until said valve is moved to uncover the port 83, whereupon the fluid communicates through a passage 84$^b$ with the second speed controlling cylinder 44. Similarly the fluid controlling valve 76$^a$ is adapted to communicate through a passage 84$^a$ with the first speed controlling cylinder 45; valve 76$^c$ through a passage 84$^c$ with the direct speed controlling cylinder 64; and valve 76$^d$ through a passage 84$^d$ with the reverse speed controlling cylinder 46.

A passage or conduit 85 in the cap 78 is continuously open to passages 84$^b$ and 84$^d$ when the valves 76$^b$ and 76$^d$ are in their illustrated position. Similarly a passage 85$^a$ in the other cap 78$^a$ is continuously open to passages 84$^a$ and 84$^c$ when the valves 76$^a$ and 76$^c$ are positioned as shown. Both of these passages 85 and 85$^a$ are in continuous communication through conduits 86$^c$ and 86$^d$ respectively, with a spill-way portion 86$^b$ emptying into an oil reservoir or sump 86 which supplies the pump E shown in Fig. 3 as a gear type pump.

Figure 5:
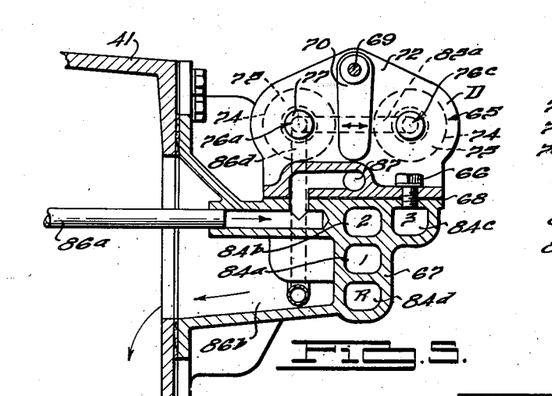
Fig. 5 is a detail sectional elevational view along the line 5—5 of Fig. 1, the section being taken through the fluid distributing valve means.
Figure 6:
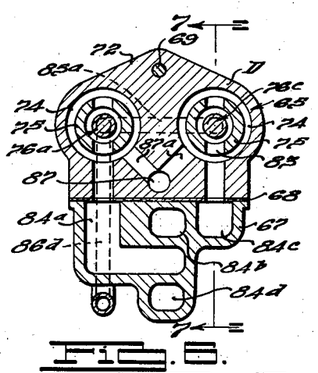
Fig. 6 is a detail sectional elevational view taken as indicated by the line 6—6 of Fig. 1.

A pipe $86^a$, as best shown in Fig. 5, extends from the fluid pressure pump E to a pressure delivery conduit 87 which extends longitudinally in casing 65. The conduit 87 communicates through its pairs of V-shaped necks $87^a$, with the pairs of valves $76^a$, $76^c$, and $76^b$, $76^d$.

If desired, a releasable spring actuated detent $87^b$ may be carried by the forward extension 71 of casing 65 which is adapted to register with an arced groove $87^c$ of reciprocative rod 69 when positioned as illustrated. Upon forward and rearward movement of rod 69, the detent $87^b$ engages arced grooves $87^d$ and $87^e$ respectively, to thereby assist in stabilizing this rod when one of the valves $76^a$, $76^b$, $76^c$, and $76^d$ is actuated against the spring 79 as will hereinafter be more apparent.

In order to drive the pump E, I have provided a pump driving gear 88 driven by a sleeve $88^a$ which is driven from clutch B in such a manner that the pump receives the drive whenever engine A is operating. Thus the drive from the engine is taken by an impeller or driving member 89 and conveyed to a runner or driven member $89^a$, member 89 being provided with the well-known fluid conducting vanes $89^b$ cooperating with companion vanes $89^c$ of the driven member $89^a$. The sleeve $88^a$ is keyed to a collar 90 to which the member 89 is secured by fasteners $90^a$. In this manner it will be noted that the engine A delivers its power to clutch B, the sleeve $88^a$ being driven with the driving structure of the clutch so that the pump E is driven directly from the engine and not from the driven member of the clutch.

The pump E is driven by gear 88 through a shaft $90^b$ having a worm gear $90^c$ in constant mesh with said gear 88. Thus the shaft $90^b$ is adapted to rotate a driving gear 91 which in turn drives a driven gear $91^a$ of the gear pump E, the pump receiving fluid from reservoir 86 through an inlet passage $91^b$ and delivering the fluid under pressure through pipe $86^a$ to the pressure distributor D. This pump drive is claimed in my co-pending application Serial No. 708,234, filed January 25, 1934.

Figure 2:
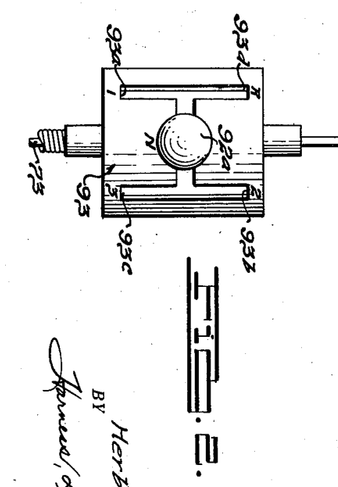
Fig. 2 is an elevational view of my shift lever mechanism shown in Fig. 1.

I shall next describe my manually operated device for actuating the distributor valve mechanism D for selectively causing operation of the transmission controlling devices 14, 15, 16 and 17. Referring to Figs. 1 and 2, I have provided an H-gate remote control, although other suitable controls can be conveniently used, if desired, to actuate my distributor mechanism. A selector arm 92 having a handle $92^a$, operably mounted in an H-gate member 93 having four position notches, $93^a$, $93^b$, $93^c$ and $93^d$, and fixed to the other end of the Bowden wire 73, is mounted at a convenient point for manipulation by the vehicle driver as at the dash $94^e$.

Figures 7, 9:
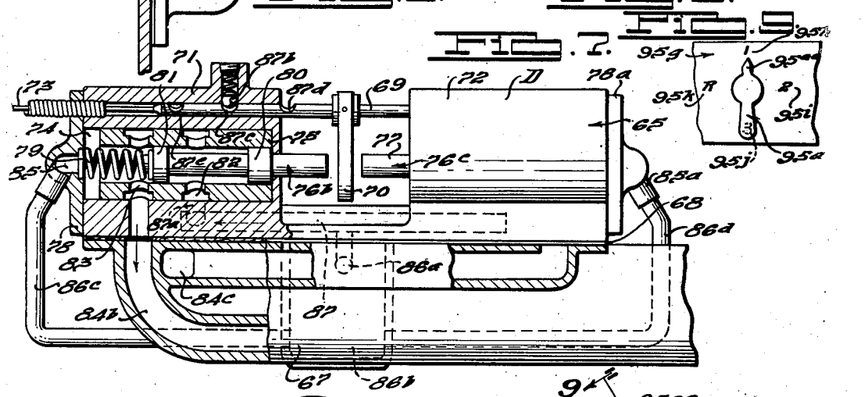
Fig. 7 is a detail sectional elevational view taken approximately as indicated by the line 7—7 of Fig. 6.
Fig. 9 is a detail elevational view of the vehicle dash, taken approximately as indicated by the line 9—9 of Fig. 8.

With reference to the operation of my distributor structure and control therefor, in Figs. 1 and 2 the handle $92^a$ is illustrated in the neutral position corresponding to the neutral position of the finger member 70 as shown in Figs. 3 and 7. However, when one of the extreme positions of the H-gate control is selected, the Bowden wire 73 is first rotated and then shifted, thus providing the control movement necessary to cause the finger 70 to actuate one of the stem portions 77 to effect first, second, direct, or reverse speed through the transmission C. When rod 69 is moved forwardly in response to the shifting of selector arm 92 to its extreme forward stations $93^b$ and $93^d$, the detent $87^b$ registers with the groove $87^d$ to hold this rod in the position desired against the pressure of spring 79 tending to return one of the valves $76^b$ and $76^d$. Similarly, when arm 92 is moved to its extreme rearward stations $93^a$ and $93^c$, the detent $87^b$ engages the groove $87^e$ to hold rod 69 in the position desired against the pressure of spring 79 tending to return valve $76^a$ or $76^c$.

In operation of the driving mechanism as thus far described, the engine A transmits its drive through the clutch B, this drive passing through the driving shaft $91^c$ to drive the transmission C, the drive therefrom being taken by shaft 18 as aforesaid. Where the transmission C is a planetary type as illustrated, I prefer to provide a clutch B of the well-known fluid coupling type since a fluid coupling or clutch has advantages of smoothness of drive where this type of clutch is used in combination with a planetary type of transmission. However, other suitable or well-known types of clutches may be used intermediate the engine and transmission as may be desired in any particular installation.

For purposes of illustration let it be assumed that the motor vehicle is standing still with the selector handle $92^a$ in its neutral position as shown in Figs. 1 and 2. In such condition the finger 70 does not actuate any of the stem portions 77. Under such circumstances there is no drive being transmitted through transmission C although the pump E is being actuated by the gear 88 to pump fluid under pressure from the reservoir 86 to the conduit 87.

When the vehicle driver desires to drive the car from the aforesaid neutral position, he grasps the handle $92^a$ and moves the selector arm 92 so that it engages the first speed notch $93^a$, thereby moving the finger 70 rotatably and rearwardly so that the finger actuates the stem portion 77 of the valve $76^a$, the fluid thus passing through passage $84^a$ to the first speed controlling cylinder 45. In such position the oil under pressure from pump E is admitted to the cylinder 45 causing the first speed controlling device 14 to be actuated and thereby drive the shaft 18 in the low speed gear ratio. This actuation of the controlling device 14 is brought about by reason of the outward displacement of the first speed pistons 47 and 48 as shown in Fig. 4, this displacement producing a contraction of the controlling device 14 to hold the first speed drum 19 stationary.

When the operator wishes to drive the vehicle in the second gear ratio provided by transmission C, he next moves the selector arm 92 from the aforesaid engagement with notch $93^a$ to register same with the second speed notch $93^b$ thereby causing the finger 70 to leave its subsequent position and to actuate the stem portion 77 of the valve $76^b$. When the finger 70 is thus moved, the oil pressure is relieved in the first speed oil passage $84^a$ so that the spring 25 associated with the first speed controlling device 14 will act to expand this device and restore the first speed pistons 47 and 48 to their normal contracted positions thereby releasing the first speed gear ratio, the fluid displaced by pistons 47 and 48 moving toward each other passing through the first speed passage $84^a$ and thence by way of return conduit 85 to the reservoir 86.

When the valve $76^b$ is actuated as aforesaid, the fluid under pressure supplied through its outlet port 83 acts through the second speed fluid conducting passage $84^b$ leading to the second speed cylinder 44, the second speed controlling device 15 being thereby actuated in the same manner as that just referred to in connection with the first speed controlling device 14.

After the car has been accelerated in the aforesaid second speed, or under such other circumstances as the vehicle driver may elect, the operator may then move the selector arm 92 to disengage the same with the second speed notch 93$^b$ and to engage this arm with the direct speed notch 93$^c$. During such movement it will be apparent that the second speed controlling device 15 is released in the same manner as that just previously described in connection with the other of the controlling devices, the fluid being then supplied to the port 83 and the direct speed oil conducting passage 84$^c$ leading to the direct speed cylinder 64 whereby to effect the engagement of the direct speed controlling clutch 17 so as to drive the shaft 18 in the direct speed.

While I have described in the foregoing assumed illustration, a progressive or step-by-step movement of the selector arm 92 to successively actuate the valves 76$^a$, 76$^b$ and 76$^c$, it will be apparent that the finger 70 may be operated by the selector arm 92 to supply the oil under pressure to any of the valves 76$^a$, 76$^b$, 76$^c$ and 76$^d$ from a previous engagement of finger 70 with any of these valves. In other words and by way of further illustration, the operator may move the finger 70 from the neutral position shown in Figs. 1 and 3 directly to the second speed valve 76$^b$ or the third or direct speed valve 76$^c$ without pausing at the successive valves.

When the operator desires to drive the vehicle in reverse, he operates the selector arm 92 to cause this arm to register with the reversing notch 93$^d$, the finger 70 being thereby moved to actuate the valve 76$^d$, the oil pressure being conducted through the reversing oil passage 84$^d$ to the reverse cylinder 46 for energizing or operating the reverse controlling device 16 of the transmission.

Figures 8, 8A:
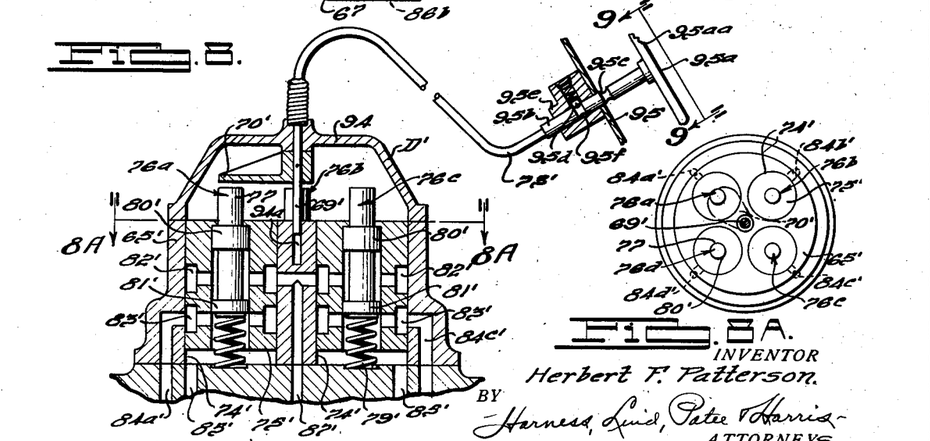
Fig. 8 is a detail sectional elevational view of a modified arrangement of distributing valve means and actuating mechanism therefor.
Fig. 8A is a detail sectional elevational view taken approximately as indicated by the line 8A—8A of Fig. 8.

Referring to Figs. 8, 8$^A$, and 9, I have shown another embodiment of my pressure distributing valve means and actuating mechanism therefor, the construction and operation being substantially the same as the first described embodiment, and I have indicated members of different construction but similar function by primed reference characters.

The pressure distributor D' includes a casing 65' having a series of annular parallel bores 74', in this instance four, which are each adapted to mount a sleeve 75' therein. Each sleeve is adapted to receive one of the reciprocative one-way valves 76$^a$, 76$^b$, 76$^c$ and 76$^d$ which has a stem portion 77 projecting through a closely fitting opening in sleeve 75', the distance each of the stem portions 77 extends from sleeve 75' preferably being uniform.

A coil spring 79' is adapted to be retained in each of sleeves 75' so that a valve portion 80' of valve 76$^a$, for example, will be normally positioned against the sleeve 75'. A second valve portion 81' of valve 76$^a$ is adapted to be positioned between an inlet port 82' and an outlet port 83' in sleeve 75' so that movement of valve 76$^a$ against the spring 79' will bring the ports 82' and 83' between the valve portions 80' and 81'. Fluid under pressure from a suitable pump, such as the aforesaid gear pump E, is continuously supplied through the port 82' but does not pass the valve 76$^a$ until said valve is moved to uncover the port 83', whereupon the fluid communicates through a passage 84$^{a'}$ with the aforesaid first speed controlling cylinder 45.

Similarly the fluid controlling valve 76$^c$ is adapted to communicate through a passage 84$^{c'}$ with the third speed controlling cylinder 64; valve 76$^b$ through a similar passage 84$^{b'}$ with the second speed controlling cylinder 44; and valve 76$^d$ through a similar passage 84$^{d'}$ with the reverse speed controlling cylinder 46.

A return conduit or passage 85' is continuously open to passages 84$^{a'}$, 84$^{b'}$, 84$^{c'}$ and 84$^{d'}$ only when the respective valves 76$^a$, 76$^b$, 76$^c$ and 76$^d$ are normally positioned as shown, the conduit 85' communicating with the oil reservoir 86.

The pipe 86$^a$ supplies fluid from pump E to a central conduit 87' which communicates continuously with the inlet ports 82' for the valves 76$^a$, 76$^b$, 76$^c$ and 76$^d$.

Mounted on the face of casting 65' is a cap 94 which completely encloses the stem portions 77. A rotatable reciprocative rod 69' extends through cap 94 to register in a central opening 94$^a$, a finger member 70' being fixed thereon. The finger member 70' is so located in Fig. 8 that in rotating with rod 69' as shown, this member will not strike the valve stem portions 77. If desired, the finger member may be of such circumferential length that it allows itself a neutral space between each pair of adjacent valve stems 77 but of relatively small arcuate length, so that the operator will not accidentally move said finger member downwardly between adjacent valve stems 77 when he intends to actuate one of the valves. In other words, the parts are so proportioned that if the operator actuates the handle 95$^a$ in the approximate vicinity of one of the indicated stations of control, he will be sure to operate the desired corresponding valve by the finger member 70' as will later be more apparent.

A suitable remote control may be attached to the other end of rod 69' to provide shifting and rotative movement for this rod. To this end a Bowden wire 73', as diagrammatically illustrated, extends forwardly from rod 69' for convenient manipulation by the vehicle driver, such position being indicated by the usual dash 95 which mounts a handle 95$^a$ connected to the other end of the Bowden wire 73'. The handle 95$^a$ has an index pointer 95$^{aa}$ and is adapted for both fore and aft and rotative movement by the hand of the vehicle driver, this handle being guided from its illustrated "out" position to an "in" position in spaced relationship from dash 95, in which position a guide portion 95$^b$ registers a circumferential notch 95$^c$ thereof with a spring pressed ball 95$^d$ carried by a guide block 95$^e$.

The ball 95$^d$ and circumferential notches 95$^c$ and 95$^f$ engageable therewith cooperate to advise the operator of the proper positioning of handle 95$^a$ for effecting the desired movement of the finger member 70'. In Fig. 8 it will be noted that the ball 95$^d$ is illustrated in engagement with the notch 95$^f$ and in this position the member 70' may be rotated without striking any of the valve stem portions 77.

For the convenience of the vehicle driver, a suitable speed selector diagram may be placed on the dash 95 in close juxtaposition with the selector handle 95$^a$ to facilitate proper selecting of speeds under conditions as will hereinafter be more apparent. Thus, I have shown an indicator diagram 95$^g$ having stations 95$^h$, 95$^i$, 95$^j$ and 95$^k$ respectively for first, second, third and reverse speeds.

Referring now to the operation of this particular embodiment, the finger member 70' is illustrated in the neutral position, that is, it may be rotated without contacting any of the stem portions 77. However, when the selector handle 95ᵃ of the remote control is rotated so that its index pointer 95ᵃᵃ is opposite one of the diagram stations 95ʰ, 95ⁱ, 95ʲ and 95ᵏ and then the handle 95ᵃ pushed inwardly to its "in" position, the finger 70′ is similarly rotated to be aligned with valves 76ᵃ, 76ᵇ, 76ᶜ and 76ᵈ respectively and then this member 70′ presses the stem portion 77 inwardly to effect first, second, third, or reverse speed through the transmission C much in the same manner as for my earlier described embodiment. The member 70′ is thus a common selector operator for the valves and is rotatable about an axis around which the axes of reciprocation of the valves are located.

For purposes of illustration, if the vehicle is standing still with the selector handle 95ᵃ in its neutral or "out" position of Fig. 8, the finger member 70′ does not actuate any of the stem portions 77. Under such circumstances no drive is transmitted through the transmission C although the pump E is being actuated by the gear 88 to pump fluid under pressure from the reservoir 86 to the conduit 87′.

Presuming now that the vehicle driver wishes to drive the vehicle from this neutral position, he grasps the selector handle 95ᵃ and rotates it until its index pointer 95ᵃᵃ is aligned with the first speed station 95ʰ, as shown in Fig. 8, and then depresses this handle to its "in" position. Simultaneously the finger member 70′ rotates so that it is aligned with the valve 76ᵃ and then presses inwardly the stem portion 77 of this valve, thereby allowing the fluid under pressure to pass through the passage 84ᵃ′ to the first speed controlling cylinder 45 to cause the first speed controlling device 14 to be actuated and to drive the shaft 18 in the low speed gear ratio. As was earlier explained in my first illustrated embodiment, this actuation of the controlling device 14 is effected by reason of the outward displacement of the first speed pistons 47 and 48, this displacement producing a contraction of the controlling device 14 so as to hold the first speed drum 19.

After driving the vehicle in the aforesaid first speed, if the vehicle driver desires to drive in the second gear ratio of the transmission C, he pulls outwardly the selector handle 95ᵃ to its "out" position and rotates it until its pointer 95ᵃᵃ is opposite the second speed station 95ⁱ, and then pushes said handle inwardly to its "in" station. Upon this movement of handle 95ᵃ, the finger member 70′ is simultaneously rotated until aligned with the second speed valve 76ᵇ whereupon said finger member depresses the stem portion 77 of this valve. When the finger member 70′ is thus moved, the oil pressure in the first speed oil passage 84ᵃ′ is relieved so that the spring 25 associated with the first speed controlling device 14 will act to expand this device and restore the first speed pistons 47 and 48 to their normal contracted positions, thereby releasing the first speed gear ratio—the fluid displaced by pistons 47 and 48 moving toward each other passing through the first speed passage 84ᵃ′ and thence by way of the return conduit 85′ to the reservoir 86.

Upon movement of valve 76ᵇ as described, the fluid under pressure, which passes from its outlet port 83′ and through the second speed fluid conducting passage 84ᵇ′ to the second speed cylinder 44, actuates the second speed controlling device 15 much in the same manner as that of the first speed drive.

After accelerating the vehicle in the aforesaid second speed, or under such other circumstances as the vehicle driver may elect, the driver may pull outwardly the selector handle 95ᵃ to its "out" position and then rotate it to align its pointer 95ᵃᵃ with the third speed station 95ʲ, and then push said handle inwardly to its "in" position. During such movement the finger member 70′ allows the spring 79′ to return the second speed valve 76ᵇ to its normal position and then presses inwardly the stem portion 77 of the third speed valve 76ᶜ. Simultaneously the second speed controlling device 15 is released in the same manner as that just previously described in connection with the other of the controlling devices. The aforesaid movement of the third speed valve 76ᶜ effects a delivery of fluid under pressure to the outlet port 83′ and through the third speed fluid conducting passage 84ᶜ′ to the third speed cylinder 64, thereby actuating the third speed controlling clutch 17 to drive the shaft 18 in direct seed.

Although I have described in the foregoing illustration a progressive or step-by-step movement of the selector handle 95ᵃ so as to successively actuate the valves 76ᵃ, 76ᵇ, and 76ᶜ, it will be apparent that the finger member 70′ may be operated by said handle 95ᵃ to actuate any of the valves 76ᵃ, 76ᵇ, 76ᶜ and 76ᵈ from a previous engagement of member 70′ with any of these valves. In other words, and by way of further illustration, the operator may move the selector handle 95ᵃ from the position shown for the first speed in Fig. 8, to directly align its pointer 95ᵃᵃ with the third speed stations 95ʲ and then push said handle to its "in" position to effect the third speed drive as described.

If the vehicle driver wishes to drive the vehicle in reverse, he rotates the selector handle 95ᵃ in its "out" position to align its pointer 95ᵃᵃ with the reverse speed station 95ᵏ and then pushes said handle 95ᵃ to its "in" station. Simultaneously the finger member 70′ rotates to be aligned with the reverse speed valve 76ᵈ, and then forces the stem portion 77 of this valve inwardly. Upon this movement of valve 76ᵈ, the fluid under pressure proceeds to the outlet port 83′ and through the reverse speed fluid conducting passage 84ᵈ′ to the reverse speed cylinder 46 to operate the reverse controlling device 16 of the transmission.

Figures 10, 11, 12, 12A, 12B, 12C, 13, 14, 15:
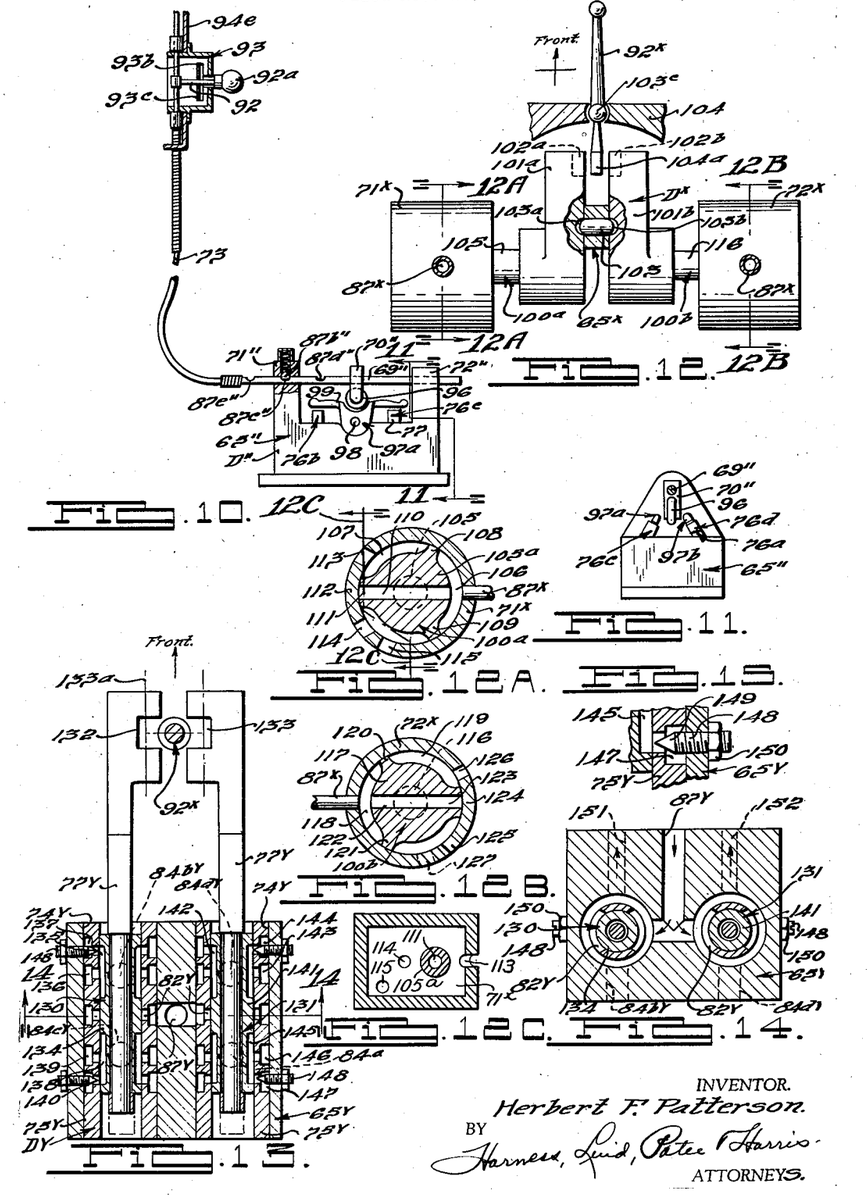
Fig. 10 is a diagrammatic elevational view of a further modified arrangement of my control mechanism.
Fig. 11 is a detail sectional elevational view taken approximately as indicated by the line 11—11 of Fig. 10.
Fig. 12 is a diagrammatic elevational view of another modified arrangement of my distributing valve means.
Fig. 12A is a detail elevational view taken as indicated by the line 12A—12A of Fig. 12.
Fig. 12B is a detail elevational view taken approximately as indicated by the line 12B—12B of Fig. 12.
Fig. 12C is a detail elevational view taken as indicated by the line 12C—12C of Fig. 12A.
Fig. 13 is a diagrammatic top plan view of still another modified arrangement of my pressure distributor valving means.
Fig. 14 is a sectional view along line 14—14 of Fig. 13.
Fig. 15 is a detail of a portion of my pressure distributor valving means of Fig. 13.

In Figs. 10 and 11 I have shown still another embodiment of my distributing valve means and actuating mechanism therefor, the construction and operation being substantially the same as that illustrated in the earlier described embodiments. I have indicated members of different construction but similar function by double-primed reference characters.

A casing 65″ of the pressure distributor D″ is adapted to house four reciprocating one-way valves 76ᵃ, 76ᵇ, 76ᶜ and 76ᵈ, each having a stem portion 77 projecting therefrom, which are adapted to selectively operate the transmission C as in my first embodiment.

The upper portion of the casing 65″ is provided with a rotatable reciprocative rod 69″ extending longitudinally therethrough and having a downwardly extending common selector actuating finger member 70″ fixed thereon immediately between forward and rearward extensions 71″ and 72″ respectively of casing 65″. The rod 69″ may, if desired, extend forwardly in extension 71″ for a solid connection with a suitable remote control. The finger member 70″ mounts a cam engaging roller member 96 which, when the rod 69″ is rotated in Fig. 11, does not strike two cam levers 97ª and 97ᵇ mounted on casing 65″.

Each of the cam levers 97ª and 97ᵇ is pivotally connected to the casing 65″, cam lever 97ª being connected at 98. The lever 97ª projects on either side of its pivotal point 98 to positions closely adjacent the stem portions 77 of valves 76ᵇ and 76ᶜ, while lever 97ᵇ extends to adjacent the stem portions 77 of valves 76ᵈ and 76ª, valves 76ᵇ and 76ᵈ being aligned. Formed on the levers 97ª and 97ᵇ are cam surfaces 99 upon which the roller member 96 is adapted to ride under conditions to be presently described.

A suitable remote control may be fixed to the rod 69″ to rotate and shift the same to cause the roller member 96 to move laterally to a position adjacent whichever of cam levers 97ª and 97ᵇ is desired and then ride the cam surfaces 99 in the direction necessary to actuate the proper stem portion 77 to effect the desired speed through the transmission C. Thus, I have illustrated the remote control shown in Figs. 1 and 2 of my first embodiment as being suitable for controlling the embodiment of my pressure distributor shown in Figs. 10 and 11. If desired, the pairs of valves 76ª, 76ᵈ and 76ᵇ, 76ᶜ may be inclined toward each other to facilitate the actuating of the stem portions 77 by the cam member 96.

A releasable spring-actuated detent 87ᵇ″ may be carried by the forward extension 71″ of casing 65″ which is adapted to register with an arced groove 87ᶜ″ of reciprocative rod 69″ when positioned as illustrated. Upon forward and rearward movement of rod 69″, the detent 87ᵇ″ engages arced grooves 87ᵈ″ and 87ᵉ″ respectively, to thereby assist in stabilizing this rod when one of the valves 76ª, 76ᵇ, 76ᶜ and 76ᵈ is actuated against the spring 79 as will be presently more apparent.

When the valve 76ª is actuated, the fluid under pressure communicates with the first speed controlling cylinder 45. Similarly the fluid controlling valve 76ᵇ is adapted to communicate with the second speed controlling cylinder 44; valve 76ᶜ with the direct speed controlling cylinder 64; and valve 76ᵈ with the reverse speed controlling cylinder 46.

Referring now to the operation of this embodiment of my pressure distributor, the selector arm 92 and the cam member 96 are illustrated in the neutral position. However, when one of the extreme positions 93ª, 93ᵇ, 93ᶜ and 93ᵈ is selected, the Bowden wire 73 is rotated and shifted, thus providing the control movement necessary to cause the roller member 96 to ride one of cam levers 97ª and 97ᵇ and to actuate one of the stem portions 77 to effect first, second, direct, or reverse speed through the transmission C.

Thus, when selector arm 92 engages the first speed notch 93ª, the valve 76ª is actuated so that fluid under pressure passes to the first speed controlling cylinder 45 and thereby effects the low speed gear ratio drive through the transmission. Similarly, when the arm 92 engages the second speed notch 93ᵇ, the valve 76ᵇ is actuated for second speed; valve 76ᶜ is actuated for direct drive when the arm 92 engages the direct drive notch 93ᶜ; and valve 76ᵈ is actuated for reverse drive when arm 92 engages the reverse drive notch 93ᵈ.

When this forward movement of rod 69″ occurs in response to the shifting of selector arm 92 to its extreme forward stations 93ᵇ and 93ᵈ, the detent 87ᵇ″ registers with the groove 87ᵈ″ to hold this rod in the position desired against the pressure of spring 79 tending to return one of the valves 76ᵇ and 76ᵈ. Likewise, when arm 92 is moved to its extreme rearward stations 93ª and 93ᶜ, the detent 87ᵇ″ engages the groove 87ᵉ″ to hold the rod 69″ in the desired position against the pressure of spring 79 tending to return valve 76ª or 76ᶜ.

In Figs. 12, 12ᴬ, 12ᴮ and 12ᶜ, I have shown still another embodiment of my distributing valve means and actuating mechanism therefor, the construction and operation being substantially the same as that illustrated in the earlier described embodiments, and members of different construction but similar function to those of my first embodiment have been indicated by primed "ˣ" reference characters.

The casing 65ˣ of the pressure distributor Dˣ is adapted to house two-way rotatable valves 100ª and 100ᵇ in its left-hand and right-hand extensions 71ˣ and 72ˣ respectively. A common axis of rotation is provided for valves 100ª and 100ᵇ, which are illustrated in their neutral positions. Rotation of one of the valves 100ª and 100ᵇ in either direction beyond its neutral position will register it with a valve port communicating with one of the actuating cylinders of the various gear trains of the transmission C much in the same manner as the earlier described embodiments of my pressure distributor.

Respectively mounted between extensions 71ˣ and 72ˣ on the valves 100ª and 100ᵇ are actuating extensions 101ª and 101ᵇ. These extensions 101ª and 101ᵇ preferably have slots 102ª and 102ᵇ respectively at their extreme inner ends to accommodate the somewhat diagrammatically illustrated remote control, it being understood that other suitable controls may be used to selectively rotate either of valves 100ª and 100ᵇ in either direction beyond its neutral position. If desired, a releasable detent 103 may be carried by casing 65ˣ to be positioned either in a recess 103ª in extension 101ª or in a recess 103ᵇ in extension 101ᵇ to function as an interlock to prevent simultaneous rotative movement of extensions 101ª and 101ᵇ. This remote control may include a shift lever 92ˣ pivoted at 103ᶜ to a convenient stationary member 104 and having an end portion 104ª adapted to engage through a suitable H-type guide, either of slots 102ª and 102ᵇ. The portion 104ª comprises a common selector operator for the two valves.

The valve 100ª has a neck portion 105 which extends into extension 71ˣ to receive thereon a valve member 105ª. This valve member 105ª co-operates with casing extension 71ˣ to provide a fluid pressure supply space or chamber 106 and a low pressure space or chamber 107, these chambers being separated from each other by radially extending valve portions 108 and 109 engaging extension 71ˣ. The pump E delivers oil under pressure through pipe 86ª and pressure delivery conduit 87ˣ, from whence the oil passes through a passage 110, having an outlet 111, extending through the valve member 105ª to an uninterrupted portion 112 intermediate conduits 113 and 114 in extension 71ˣ so that when the outlet 111 is opposite the portion 112 as shown, the oil in passage 110 will not escape, this position being the neutral setting of valve 100ª. The outlet 111 is further adapted for selective alignment with the conduits 113 and 114.

The low pressure chamber 107 is continuously open to a conduit 115 which is arranged below the plane of oscillatory movement of outlet 111, the conduit 115 communicating with the oil reservoir 86. During movement of valve member 105ª, the high pressure chamber 106 is continuously in communication with the pressure delivery conduit 87×, and the low pressure chamber 107 is continuously in communication with the return conduit 115.

The distributor valve member 105ª is adapted to be manually adjusted by H-movement actuation of shift lever 92× by the vehicle driver. When the valve 100ª is rotated forwardly, the valve member 105ª rotates also to a position wherein the outlet 111 is in communication with the direct speed supplying conduit 113 which communicates with the direct speed controlling cylinder 64. In similar fashion the valve 100ª can be rotated rearwardly beyond its illustrated neutral spot to a position establishing communication between outlet 111 and the second speed conduit 114, which communicates with the second speed controlling cylinder 44.

Referring now to the valve 100ᵇ, best shown in Fig. 12ᴮ, this valve is quite similar in construction and operation to valve 100ª except that it is adapted to effect a low speed and a reverse drive through the transmission C. The valve 100ᵇ has a neck portion 116 which extends into extension 72× to receive thereon a valve member 117. The valve member 117 cooperates with casing extension 72× to provide a fluid pressure supply space or chamber 118 and a low pressure space or chamber 119, these chambers being separated from each other by radially extending valve portions 120 and 121 engaging extension 72×.

Oil under pressure from the pressure delivery conduit 87× passes through a passage 122, having an outlet 123, extending through the valve member 117 to an uninterrupted portion 124 intermediate conduits 125 and 126 in extension 72× so that when the outlet 123 is opposite the portion 124 as shown, the oil in passage 122 will not escape, this position being the neutral setting of valve 100ᵇ. The outlet 123 is further adapted for selective alignment with the conduits 125 and 126.

The low pressure chamber 119 is continuously open to a conduit 127 which is arranged below the plane of oscillatory movement of outlet 123, the conduit 127 communicating with the oil reservoir which supplies the pump E. During movement of valve member 117, the high pressure chamber 118 is continuously in communication with the pressure delivery conduit 87×, and the low pressure chamber 119 is continuously in communication with the return conduit 127.

In a manner similar to that for valve member 105ª, the valve member 117 is adapted to be manually adjusted by actuation of shift lever 92× by the vehicle driver. When the valve 100ᵇ is rotated forwardly, the valve member 117 rotates also to a position wherein the outlet 123 is in communication with the first speed supplying conduit 125 which communicates with the first speed controlling cylinder 45. The valve 100ᵇ is adapted to be rotated rearwardly, in similar fashion, beyond its illustrated neutral spot to a position establishing communication between the outlet 123 and the reverse speed conduit 126, which communicates with the reverse speed controlling cylinder 46.

With reference to the operation of this embodiment of my pressure distributor and control, the lever 92× and the extensions 101ª and 101ᵇ are illustrated in their neutral position, by reason of which the outlets 111 and 123 are opposite their respective uninterrupted portions 112 and 124 in their neutral positions.

However, when the lever 92× is moved to the left and rearwardly to effect the low speed drive through the transmission C, the end portion 104ª of this lever engages slot 102ᵇ and moves the actuating portion 101ᵇ forwardly to rotate the outlet 123 to a position establishing its communication with the first speed supplying conduit 125. Therewith the fluid from the pump E passes through conduit 125 to the first speed controlling cylinder 45, causing the first speed controlling device 14 to be actuated to drive the shaft 18 in the low speed gear ratio.

When the operator desires to establish the vehicle drive in a further gear ratio such as a higher gear ratio, he moves the lever 92× forwardly, in order to align the detent 103 and recesses 103ª and 103ᵇ, and then causes the end portion 104ª to engage slot 102ª and to rotate the actuating portion 101ª rearwardly to its second speed position, for example, such movement rotates the valve member 105ª to align the fluid outlet 111 with the second speed supplying conduit 114. As soon as such movement takes place, the first speed conduit 125 is opened to the low pressure chamber 119 and the first speed controlling device 14 is released, the fluid displaced by pistons 47 and 48 moving toward each other passing through the first speed conduit 125 to the low pressure chamber 119 and thence by way of return conduit 127 to the reservoir 86.

In similar manner, the lever 92× may be moved rearwardly from its second speed position to rotate the actuating portion 101ª rearwardly to its third or direct speed position. As soon as such movement occurs, the second speed control device 15 is released, and the fluid outlet 111 is aligned with the direct speed supplying conduit 113 to actuate the direct speed controlling clutch 17, thus establishing a direct drive in high gear ratio for the motor vehicle.

It will be readily understood that the vehicle driver may manipulate the lever 92× in any desired position, it being unnecessary that this lever be moved in progressive order to its earlier described positions for first, second and direct speeds.

When it is desired to operate the motor vehicle in reverse, the vehicle driver shifts the lever 92× to its extreme left forward position, the end portion 104ª of this lever engaging slot 102ᵇ and moving the actuating portion 101ᵇ rearwardly to align the outlet 123 with the reverse speed conduit 126. The fluid under pressure passes through the conduit 126 to actuate the reverse drive controlling device 16, and thereby establishes the reverse drive of the driven shaft 18.

Referring now to Figs. 13 and 14, I have shown still another embodiment of my distributing valve means and actuating mechanism therefor, its construction and operation being substantially the same as that illustrated in the earlier described embodiments, and members of different construction but similar function to those of my first embodiment have been indicated by primed "y" reference characters.

Housed in casing 65ʸ of the pressure distributor Dʸ are two-way reciprocative valves 130 and 131, these valves preferably being parallel and horizontal. In Figs. 13 and 14 the valves 130 and 131 are illustrated in their neutral positions and each is adapted to be shifted to either side of its neutral position to register with a valve port communicating with one of the actuating cylinders of the various gear trains of the transmission C and a fluid inlet port much in the same manner as the earlier described embodiments of my pressure distributor and control.

The stem portion $77^y$ formed on the forward end of each of the valves 130 and 131 have aligned slots 132 and 133 adapted to be selectively shifted forwardly and rearwardly by a suitable remote control such as the H-shift lever $92^x$ of Fig. 13 whose path of movement is indicated at $133^a$.

The casing $65^y$ is provided with a pair of parallel bores $74^y$ which are each adapted to mount a sleeve $75^y$ therein. Each sleeve is adapted to receive one of the reciprocative two-way valves 130 and 131, each of said valves having its stem portion $77^y$ project through a closely fitting opening in the casing $65^y$.

The valve 130 is adapted to be moved forwardly and rearwardly, but has been illustrated in its neutral or intermediate stations wherein a valve portion 134 is positioned opposite a central conduit $87^y$ which communicates continuously with the inlet port $82^y$ for said valve. An elongated circumferential fluid pressure port 135 of valve 130 communicates continuously in this position with an outlet port 136 and a relief groove 137 communicating with the reservoir 86. When the valve 130 is moved rearwardly, the elongated port 135 goes out of communication with relief groove 137 just prior to the registering of both of the ports $82^y$ and 136 with the port 135. Fluid under pressure from pump E is continuously supplied through the central conduit $87^y$ to the port $82^y$ but does not pass the valve portion 134 of valve 130 until said valve is moved rearwardly as described, whereupon the fluid communicates through passage $84b^y$ with the second speed controlling cylinder 44.

Another elongated fluid pressure port 138 of valve 130 communicates continuously in the position illustrated with an outlet port 139 and a relief groove 140 in the sleeve $75^y$ communicating with the fluid reservoir for pump E. Upon forward movement of valve 130, the elongated port 138 discontinues its communication with the relief groove 140 just prior to the registering of both of the ports $82^y$ and 139 with the port 138. It is quite obvious that fluid under pressure from pump E is continuously supplied through the central conduit $87^y$ to the port $82^y$ but does not pass the valve portion 134 of valve 130 until said valve is selectively moved either forwardly as described to permit the fluid to communicate through passage $84c^y$ with the third speed controlling cylinder 64, or moved rearwardly to permit the fluid to communicate with the second speed controlling cylinder 44 as already described.

The operation and construction of the valve 131 are similar to that of valve 130, the primary difference being that the former is adapted to effect a low speed and a reverse drive through the transmission C.

Valve 131, as well as valve 130, are adapted to be moved forwardly and rearwardly. As illustrated, valve 131 is in its neutral or intermediate stations wherein a valve portion 141 is positioned in alignment with the inlet port $82^y$ communicating continuously with the central conduit $87^y$. An elongated circumferential fluid pressure port 142 of valve 131 communicates continuously in this position with an outlet port 143 and a relief groove 144 in the sleeve $75^y$ communicating with the reservoir 86. As the valve 131 is moved rearwardly, the elongated port 142 goes out of communication with relief groove 144 just prior to the registering of both of the ports $82^y$ and 143 with the port 142. The pump E continuously supplies fluid under pressure through the central conduit $87^y$ to the port $82^y$ but this fluid does not pass the valve portion 141 of valve 131 until said valve is moved rearwardly as described, whereupon this fluid communicates through passage $84d^y$ with the reverse speed controlling cylinder 46.

Valve 131 is provided with another elongated circumferential fluid pressure port 145 which communicates continuously in the illustrated position with an outlet port 146 and a relief groove 147 open to conduit $85^y$ in the sleeve $75^y$. When valve 131 is moved forwardly, the elongated port 145 stops communicating with the relief groove 147 just prior to the registering of both of the ports $82^y$ and 146 with said port 145. Thus, fluid under pressure from pump E is continuously supplied through the central conduit $87^y$ to the port $82^y$ but does not pass the valve portion 141 of valve 131 until said valve is selectively moved either forwardly as described to permit the fluid to communicate through passage $84a^y$ with the first speed controlling cylinder 45, or moved rearwardly as described to allow the fluid to communicate with the reverse speed controlling cylinder 46.

Referring now to the operation of this embodiment of my selective pressure distributor, the shift lever $92^x$ and the valves 130 and 131 are illustrated in their neutral position, by reason of which the valve portions 134 and 141 are in alignment with the circumferential inlet port $82^y$ wherein no fluid under pressure passes by the valves 130 and 131.

However, when the lever $92^x$ is moved by the vehicle driver to its extreme left rear stations to effect the low speed drive through the transmission C, the end portion $104^a$ of lever $92^x$ (see Fig. 12) engages slot 133 and moves the valve 131 forwardly so that communication is established between the ports $82^y$ and 146. The fluid from pump E thereupon passes through passage $84a^y$ to the first speed controlling cylinder 45, causing the first speed controlling device 14 to be actuated to drive the shaft 18 in the low speed gear ratio.

When it is the operator's desire to establish the vehicle drive in a further gear ratio such as a higher gear ratio, he moves the lever $92^x$ to its extreme right forward station, thereby returning the valve 131 to its neutral position and shifting the valve 130 rearwardly to its second speed, for example. Such movement of valve 130 establishes communication between the ports $82^y$ and 138, the fluid from pump E thereupon passing through passage $84b^y$ to the second speed controlling cylinder and thereby driving the shaft 18 in the second speed gear ratio. As soon as such movement of lever $92^x$ occurs, the first speed passage $84a^y$ is opened to the relief groove 147 and the first speed controlling device 14 is released, the fluid displaced by pistons 47 and 48 moving toward each other, passing through the first speed passage $84a^y$ to the relief groove 147 to be returned to the reservoir 86.

Similarly the lever $92^x$ may be moved to its extreme right rear station from its aforesaid second speed position, thereby moving the valve 130 forwardly to its third or direct speed position. As soon as such movement occurs the second speed control device 15 is released, and communication between the ports $82^y$ and 139 is established to allow the fluid from the pump E to pass through passage $84c^y$ to the third speed controlling cylinder 64 and drive the shaft 18 in the direct speed ratio.

It is evident that the vehicle driver may manipulate the lever 92× in any desired position, it being unnecessary that this lever be moved in progressive order to its earlier described positions for first, second and direct speeds.

To operate the motor vehicle in reverse, the vehicle driver shifts the lever 92× to its extreme left-forward station, the end portion 104ᵃ of lever 92× engaging slot 133 and moving valve 131 rearwardly until communication is established between the ports 82ʸ and 143. Thereupon the fluid under pressure from pump E passes through the passage 84dʸ to the reverse speed controlling cylinder 46, effecting actuation of the reverse speed controlling device 16 to drive the shaft 18 in the reverse gear ratio.

As a further feature of my invention I have provided means for delaying the release of any operating brake when the transmission is manipulated to operate another of the brakes in order to minimize and substantially eliminate the dwell or "dead spot" through the transmission during the various manipulations from one condition of speed ratio drive to another. My improved means for controlling the release of the various brakes may be used with any of the illustrated embodiments of my invention, one form of this improvement being shown in connection with the embodiment illustrated in Figs. 13 and 14 wherein the fluid during its return from the operating means of each brake is restricted sufficiently to obtain the desired delay in the release of any brake after the selector control mechanism has been manipulated for a new condition of drive.

An adjustment screw 148 (see Fig. 15) extends inwardly through the casing 65ʸ to position its valve end portion 149 within the reduced portion of the relief groove 147. This screw receives a locking nut 150 which can be tightened against the casing 65ʸ after the screw has been adjusted to the desired position to restrict the flow of fluid from the pistons 47 when they move toward each other after the valve 131 has been returned to its position of Fig. 13 as will be presently apparent.

An adjustment screw similar to screw 148 can be carried by the casing 65ʸ for each of the relief grooves 137, 140 and 144, as illustrated in Fig. 13, so that the flow of fluid through these grooves can be adjustably restricted in similar fashion as for the groove 147. Each of these relief grooves 137, 140, 144 and 147 opens to a conduit through the valve casing 65ʸ for returning the fluid from the various brake operators to the sump 86. In Fig. 14 I have illustrated these passages at 151 and 152 respectively communicating with the relief grooves 137 and 144.

The operation of this control means includes an individual brake disengagement control whereby each of the transmission controlling devices 14, 15 and 16, and clutch 17 are released at a predetermined desired rate. The screw 148 is adjusted to obstruct to a predetermined degree the reduced portion of the relief groove 147.

When the valve 131 is moved forwardly by the vehicle driver to drive the vehicle in first or low speed, the elongated port 145 moves beyond the relief groove 147 just prior to the registering of both the ports 82ʸ and 146 with said port 145, as already described. During this drive, the fluid under pressure passes through the passage 84aʸ to force the pistons 47 and 48 apart in cylinder 45 to actuate the first speed controlling device 14. However, when the driver moves this valve 131 rearwardly while selecting another speed, the port 145 again communicates with the relief groove 147 to open the port 146 with the reservoir—thereby allowing the pistons 47 and 48 to move toward each other under the influence of spring 25, forcing the pistons to displace the fluid within cylinder 45 through the passage 84aʸ to the relief groove 147. This fluid flow into groove 147 will be restricted by the valve end portion 149 of screw 148 to control its flow at a predetermined rate.

This control of the flow causes the controlling device 14 to release slowly enough so that the newly selected controlling device will be operated in predetermined relationship with the releasing controlling device. Thus, by an appropriate setting of the restriction, it is possible to begin the engagement of one brake just as another brake is released without any appreciable "dead spot" in the transition between speed driving conditions. A further restriction will produce an overlap in the release of one brake and the engagement of a newly selected brake and a small amount of overlap is ordinarily desired to minimize the "dead spot" between selected settings in the drive.

This avoids or minimizes any objectionable transition "dead spot" when the driver selects the various speeds, and reduces the transition time to a minimum. Furthermore, the vehicle engine is always in control and cannot run rapidly as there is an overlap of engagement of the controlling device 14 and the controlling device selected, or at least a greatly reduced time interval of no drive at all. By reason of my improvements, shocks due to the changing of speeds are reduced to a minimum, the parts are less likely to be injured, and the vehicle passengers are not objectionably jolted.

A similar restriction is preferably associated with the return fluid line of each of the speed ratio controlling devices so that all speed changes will be benefited by my improvements. Obviously, if desired, a fixed restriction may be provided at any point in the return lines in lieu of the adjustable restricting screws illustrated.

Various modifications and changes will be readily apparent from the teachings of my invention, as set forth in the appended claims, and it is not my intention to limit my invention to the particular details of construction and operation shown and described for illustrative purposes.

What I claim is:

1. In a motor vehicle transmission of the planetary gear type having a plurality of planetary gear operated rotary controlling elements, a plurality of means respectively associated with said rotary elements and adapted for operative engagement therewith to control the drive through the transmission, a fluid pressure operated device for operating each of said element engaging means, a plurality of valves movable relative to each other from closed to opened positions to selectively supply fluid under pressure respectively to said devices, means for mounting said valves at the transmission for remote control by the vehicle driver, a fluid supply reservoir, pump means for supplying fluid under pressure from said reservoir to said plurality of valves, means for returning said fluid from said devices to said reservoir, a selector element manually adjustable to a plurality of stations of transmission control respectively corresponding to a plurality of transmission forward drives, neutral and reverse, means for mounting said selector element remotely from the transmission and in position for manual selective operation by the vehicle driver, and remote control Bowden wire mechanism operable between said selector element and said valves for selectively opening each of said valves to selectively supply said fluid to said devices in direct response to said manual adjustment of said selector element, said mechanism operating to open only one of said valves during adjustment of said selector element from its neutral station to any of its remaining stations of selective adjustment.

2. In a motor vehicle transmission of the planetary gear type having a plurality of planetary gear operated rotary controlling elements, a plurality of means respectively associated with said rotary elements and adapted for operative engagement therewith to control the drive through the transmission, a fluid pressure operated device for operating each of said element engaging means, a plurality of valves adapted to selectively supply fluid under pressure respectively to said devices, ported means for housing said valves at the transmission for remote control by the vehicle driver, each of said valves having an actuating portion operably connected thereto and disposed without said casing, pump means for supplying fluid under pressure from said reservoir to said plurality of valving means, means for returning said fluid from said devices to said reservoir, remote control Bowden wire mechanism for selectively operating the actuating portions of said valves to selectively control the supply of said fluid to said devices, and a single selector element mounted remotely from the transmission and manually adjustable by the vehicle driver to a plurality of stations of transmission control for actuating said Bowden mechanism, said devices being selectively operated in direct response to manual adjustment of said selector element.

3. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and movable relative to each other from closed to opened positions to control communication between a source of fluid under pressure and said devices, a selector element manually shiftable to a plurality of stations of transmission control respectively corresponding to said plurality of forward driving speeds and reverse, means for mounting said selector element remotely from said valves and in position for manual shifting by the vehicle driver, and remote control Bowden wire mechanism operable between said selector element and said valves for selectively opening each of said valves to effect changes in the drive through the transmission in direct response to manual shift of said selector element.

4. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and movable relative to each other from closed to opened positions to control communication between a source of fluid under pressure and said devices, a selector element manually shiftable to a plurality of stations of transmission control respectively corresponding to said plurality of forward driving speeds and reverse, and means for mounting said selector element remotely from said valves and in position for manual shifting movements in a substantially H-shaped path by the vehicle driver, and remote control Bowden wire mechanism operable between said selector element and said valves for selectively opening each of said valves to effect changes in the drive through the transmission in direct response to manual shift of said selector element.

5. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and movable relative to each other from closed to opened positions to control communication between a source of fluid under pressure and said devices, manually operable remotely controlled operating means for selectively opening each of said valves independently of the remaining valves and including a selector element manually shiftable to a plurality of stations of transmission control respectively corresponding to said plurality of forward driving speeds and reverse, said manually operable means providing selective operative connections between said selector element and said valves in response to the first part of selective shifting movements of said selector element from one of said stations to another, the latter part of said shifting movements acting to open a selected valve for effecting changes in the transmission drive in direct response to shift of said selector element.

6. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and respectively adapted to control communication between a source of fluid under pressure and said devices, manually controlled operating means for selectively operating said valves and including a selector element manually shiftable to a plurality of stations of transmission control respectively corresponding to said plurality of forward driving speeds and reverse, and means for mounting said selector element for shifting movements in a substantially H-shaped path, said manually controlled operating means providing selective operative connections with said valves in response to the first part of selective shifting movements of said selector element from one of said stations to another.

7. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valving means respectively adapted to control communication between a source of fluid under pressure and at least one of said devices, manually controlled Bowden wire operating means for selectively operating said valving means and including a selector element manually shiftable to a plurality of stations of transmission control respectively corresponding to said plurality of forward driving speeds and reverse, and means for mounting said selector element for shifting movements remotely from said valving means.

8. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valving means respectively adapted to control communication between a source of fluid under pressure and at least one of said devices, manually controlled Bowden wire operating means for selectively operating said valving means and including a selector element manually shiftable to a plurality of stations of transmission control respectively corresponding to said plurality of forward driving speeds and reverse, and means for mounting said selector element remotely from said valving means for shifting movements in a substantially H-shaped path.

9. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valving means respectively adapted to control communication between a source of fluid under pressure and at least one of said devices, manually controlled Bowden wire operating means for selectively operating said valving means and including a selector element manually shiftable to a plurality of stations of transmission control respectively corresponding to said plurality of forward driving speeds and reverse, and means for mounting said selector element remotely from said valving means for manual shifting in a plurality of directions of movement, said Bowden wire operating means being so constructed and arranged that manual shifting of said selector element in one of said directions of movement selectively establishes an operable relationship between said selector element and said plurality of valving means while manual shifting of said selector element in another of said directions of movement operates the selected valving means through said Bowden wire operating means.

10. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and movable relative to each other from closed to opened positions to control communication between a source of fluid under pressure and said devices, a common selector operating member adapted for selective adjustment in one direction to a plurality of positions in each of which said common member is adapted for operation in a different direction for opening at least one of said valves in each of said positions, means for supporting said common member to accommodate said adjustment and operation thereof, a selector element manually shiftable to a plurality of stations of transmission control respectively corresponding to said plurality of forward driving speeds and reverse, and operating means for selectively adjusting and operating said common member as aforesaid in response to shift of said selector element.

11. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and movable relative to each other from closed to opened positions to control communication between a source of fluid under pressure and said devices, a common selector operating member adapted for selective adjustment to a plurality of positions for selectively operating said valves to their opened positions, means for supporting said common member to accommodate said adjustment and operation thereof, manually controlled operating means for selectively adjusting and operating said common member as aforesaid and including a selector element manually shiftable to a plurality of stations of transmission control respectively corresponding to said plurality of forward driving speeds and reverse, and means for mounting said selector element for shifting movements in a substantially H-shaped path.

12. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and respectively adapted to control communication between a source of fluid under pressure and said devices, means for supporting said valves for reciprocation along axes disposed substantially parallel with each other, said valves being arranged in contiguous paired groups, the valves of each pair being operable for valve opening movement in relatively opposite directions and having their axes of reciprocation substantially coincident with each other, a common selector operating member, means for supporting said common member for selective adjustment transversely to said axes to positions for selectively operating said valves, and manually controlled operating means for selectively adjusting and operating said common member as aforesaid and including a selector element manually shiftable to a plurality of stations of transmission control respectively corresponding to said plurality of forward driving speeds and reverse.

13. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and respectively adapted to control communication between a source of fluid under pressure and said devices, means for supporting said valves for reciprocation along axes disposed substantially parallel with each other, said valves being operable for valve opening movement in the same direction and having their axes of reciprocation spaced radially from a central axis, a common selector operating member, means for supporting said common member for selective swinging adjustment about said central axis to positions for selectively operating said valves, and manually controlled operating means for selectively adjusting and operating said common member as aforesaid and including a selector element manually shiftable to a plurality of stations of transmission control respectively corresponding to said plurality of forward driving speeds and reverse.

14. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, a plurality of fluid pressure operated devices for respectively operating said plurality of element engaging means, a plurality of valves one for each of said devices and respectively adapted to control communication between a source of fluid under pressure and said devices, a plurality of valve actuating elements, means for mounting each of said valve actuating elements for selective rocking movements to operate a pair of said valves, a common selector operating member, means for supporting said common member for selective adjustment to positions for selectively rocking said valve actuating elements, and manually controlled operating means for selectively adjusting and operating said common member as aforesaid and including a selector element manually shiftable to a plurality of stations of transmission control respectively corresponding to said plurality of forward driving speeds and reverse.

15. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, manually controlled power operating means for selectively operating said plurality of element engaging means, a selector element manually shiftable to a plurality of stations of transmission control respectively corresponding to said plurality of forward driving speeds and reverse for controlling selective operation of said power operating means, said manually controlled power operating means including a common selector operating member and remote control Bowden wire operating mechanism operably connecting said common member with said selector element, and means for mounting said selector element for shifting movements in a substantially H-shaped path.

16. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling operation of said power operating means and said selector operating means, means including remote control Bowden wire mechanism operably connecting said selector element with said selector operating means, and means for mounting said selector element for shifting movements in a substantially H-shaped path.

17. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling operation of said power operating means and said selector operating means, means including remote control Bowden wire mechanism operably connecting said selector element with said selector operating means, and means for mounting said selector element for shifting movements in a substantially H-shaped path, shifting movement of said selector element between the arms of said H-shaped path controlling the operation of said selector operating means and shifting movement of said selector element along the arms of said H-shaped path controlling the operation of said power means.

18. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, manually controlled fluid power operating means for selectively operating said plurality of element engaging means, a selector element manually shiftable to a plurality of stations of transmission control respectively corresponding to said plurality of forward driving speeds and reverse for controlling selective operation of said fluid power operating means, said manually controlled fluid power operating means including a common selector operating member and remote control Bowden wire operating mechanism operably connecting said common member with said selector element, and means for mounting said selector element for shifting movements in a substantially H-shaped path.

19. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said fluid power operating means to said plurality of element engaging means, a selector element manually shiftable to a plurality of stations of transmission control respectively corresponding to said plurality of forward driving speeds and reverse for controlling operation of said fluid power operated means and said selector operating means, means including remote control Bowden wire mechanism operably connecting said selector element with said selector operating means, and means for mounting said selector element for shifting movements in a substantially H-shaped path.

20. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, valving means for controlling said fluid power operating means, means for mounting said valving means at the transmission, a selector element manually shiftable to a plurality of stations of transmission control respectively corresponding to said plurality of forward driving speeds and reverse for controlling operation of said fluid power operating means, means for mounting said selector element remotely from the transmission for shifting movements by the vehicle driver in a substantially H-shaped path, and means responsive to shifting movements of said selector element from one of said stations to another for operating said valving means.

21. In a motor vehicle transmission having a plurality of speed ratio controlling devices, a plurality of fluid pressure operators respectively for operating each of said devices, a plurality of valves movable relative to each other from closed to opened positions for selectively supplying fluid under pressure respectively to said fluid pressure operators, means for mounting said valves at the transmission for remote control by the vehicle driver, a fluid pressure reservoir, pump means for supplying fluid under pressure from said reservoir to said plurality of valves, means for returning said fluid from said fluid pressure operators to said reservoir, a selector element manually adjustable to a plurality of stations of transmission control respectively corresponding to a plurality of transmission forward drives, neutral and reverse, means for mounting said selector element remotely from the transmission and in position for manual selective operation by the vehicle driver, and remote control Bowden wire mechanism operable between said selector element and said valves for selectively opening each of said valves to selectively supply said fluid to said devices in direct response to said manual adjustment of said selector element, said mechanism operating to open only one of said valves during adjustment of said selector element from its neutral station to any of its remaining stations of selective adjustment.

22. In a motor vehicle transmission having a plurality of speed ratio controlling devices for respectively controlling the drive to the vehicle in a plurality of forward speeds and in reverse, a plurality of fluid pressure operators respectively for operating said devices, a plurality of valving means respectively adapted to control communication between a source of fluid under pressure and at least one of said fluid pressure operators, means for mounting said plurality of valving means for movement relative to each other, manually controlled Bowden wire operating means for selectively operating said valving means and including a selector element manually shiftable to a plurality of stations of transmission control respectively corresponding to said plurality of forward driving speeds and reverse and means for mounting said selector element for shifting movements remotely from said valving means.

23. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling operation of said power operating means and said selector operating means, means for mounting said selector element for shifting movements in a substantially H-shaped path, and means including a Bowden wire mechanism operably connecting said selector element with one of said operating means.

24. In a motor vehicle transmission of the planetary gear type having a plurality of planetary gear operated rotary controlling elements, a plurality of means respectively associated with said rotary elements and adapted for operative engagement therewith to control the drive through the transmission, a fluid pressure operated device for operating each of said element engaging means, a plurality of valves movable relative to each other from closed to opened positions to selectively supply fluid under pressure respectively to said devices, means for mounting said valves at the transmission for remote control by the vehicle driver, a fluid supply reservoir, pump means for supplying fluid under pressure from said reservoir to said plurality of valves, means for returning said fluid from said devices to said reservoir, a selector element manually adjustable to a plurality of stations of transmission control respectively corresponding to a plurality of transmission forward drives, neutral and reverse, means for mounting said selector element remotely from the transmission and in position for manual selective operation by the vehicle driver, and remote control Bowden wire mechanism operable between said selector element and said valves for selectively opening each of said valves to selectively supply said fluid to said devices in direct response to said manual adjustment of said selector element, said mechanism operating to open only one of said valves during adjustment of said selector element from its neutral station to any of its remaining stations of selective adjustment, said mounting means for said selector element accommodating manual adjustment thereof in a plurality of directions of movement, said Bowden wire operating mechanism being so constructed and arranged that manual adjustment of said selector element in one of said directions of movement selectively establishes an operable relationship between said selector element and said valves while manual adjustment of said selector element in another of said directions of movement operates the selected valve to its opened position.

25. In a motor vehicle transmission of the planetary gear type having a plurality of planetary gear operated rotary controlling elements, a plurality of means respectively associated with said rotary elements and adapted for operative engagement therewith to control the drive through the transmission, a fluid pressure operated device for operating each of said element engaging means, a plurality of valves movable relative to each other from closed to opened positions to selectively supply fluid under pressure respectively to said devices, means for mounting said valves at the transmission for remote control by the vehicle driver, a fluid supply reservoir, pump means for supplying fluid under pressure from said reservoir to said plurality of valves, means for returning said fluid from said devices to said reservoir, a selector element manually adjustable in a substantially H-shaped path to a plurality of stations of transmission control respectively corresponding to a plurality of transmission forward drives, neutral and reverse, means for mounting said selector element remotely from the transmission and in position for manual selective operation by the vehicle driver, and remote control Bowden wire mechanism operable between said selector element and said valves for selectively opening each of said valves to selectively supply said fluid to said devices in direct response to said manual adjustment of said selector element, said mechanism operating to open only one of said valves during adjustment of said selector element from its neutral station to any of its remaining stations of selective adjustment.

HERBERT F. PATTERSON.

CERTIFICATE OF CORRECTION.

Patent No. 2,162,788.   June 20, 1939.

HERBERT F. PATTERSON.

It is hereby certified that error appears in the printed specification of the above numbered patent requiring correction as follows: Page 6, second column, line 21, for the word "seed" read speed; page 10, first column, line 58, for "of" read to; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.